No. 897,056. PATENTED AUG. 25, 1908.
C. W. BOWRON.
VOTING MACHINE.
APPLICATION FILED DEC. 18, 1902.

No. 897,056. PATENTED AUG. 25, 1908.
C. W. BOWRON.
VOTING MACHINE.
APPLICATION FILED DEC. 18, 1902.

Witnesses.
C. H. Keeney.
Alma Klug.

Inventor.
Charles W. Bowron
By Benedict, Morsell & Green
Attorneys.

No. 897,056. PATENTED AUG. 25, 1908.
C. W. BOWRON.
VOTING MACHINE.
APPLICATION FILED DEC. 18, 1902.

Witnesses.
C. H. Keeney.
Alma Klug.

Inventor.
Charles W. Bowron
By Benedict, Morsell & Green
Attorneys.

No. 897,056. PATENTED AUG. 25, 1908.
C. W. BOWRON.
VOTING MACHINE.
APPLICATION FILED DEC. 18, 1902.

No. 897,056. PATENTED AUG. 25, 1908.
C. W. BOWRON.
VOTING MACHINE.
APPLICATION FILED DEC. 18, 1902.

Witnesses:
C. H. Keeney.
Alma Klug.

Inventor:
Charles W. Bowron
By Benedict, Morsell & Green
Attorneys.

UNITED STATES PATENT OFFICE.

CHARLES W. BOWRON, OF OSHKOSH, WISCONSIN.

VOTING-MACHINE.

No. 897,056.     Specification of Letters Patent.     Patented Aug. 25, 1908.

Application filed December 18, 1902. Serial No. 135,784.

*To all whom it may concern:*

Be it known that I, CHARLES W. BOWRON, residing at Oshkosh, in the county of Winnebago and State of Wisconsin, have invented a new and useful Improvement in Voting-Machines, of which the following is a description, reference being had to the accompanying drawings, which are a part of this specification.

The object of my invention is to provide an improved machine or apparatus, adapted to enable a person to vote at an election any one of several straight party tickets having a plurality of names thereon, or for individual candidates on any one of such tickets, or severally for additional persons, or for persons or measures irrespective of party tickets; the machine being adapted to enable a person to vote in conformity with the Australian ballot system, or in such general and specific manner as is provided for by the constitution and laws of many of the States, and especially of Wisconsin, and to have such vote automatically registered and counted.

The machine in the form herein shown and described is adapted for all the purposes of an election in many of the States, and with obvious and slight changes, can be readily adapted to enable a person therewith to vote in conformity with the laws of most or all the States. The novel mechanism or apparatus in which the invention is embodied, is simple, compact, strong, reliable and easily operated, and can be manufactured at a minimum of cost.

The invention consists of the mechanism or apparatus, its parts and combinations of parts, as herein described and claimed, or the equivalents thereof.

For mounting and inclosing the operative parts of my improved apparatus or machine, and for obtaining certain desirable results in connection with the operative mechanism or apparatus, I provide a case which is preferably constructed in an upper section A and a lower section B, the case being preferably in oblong rectangular form and the upper section being advisably hinged at one end to the lower section, and provided with a hasp C or some equivalent means for securing the upper section of the case detachably to the lower section thereof. While some of the parts embodying my invention might properly be denominated apparatus, rather than mechanism, yet for the purpose of this application I shall hereinafter denominate the structure as a "voting machine", and the parts thereof will be treated as mechanism. The case may be of any suitable size, and may be constructed of such material and of such form specifically, as will best adapt it for the purpose for which it is to be employed. The lower section of the case while it is employed to support the upper section, consists chiefly of compartments or receptacles for the disks or ballots employed in voting, while most of the operative mechanism is mounted on the upper section of the case.

In the drawings 2 is a plate advisably of metal within and entirely across the upper section of the case, and which for convenience of attachment thereto, is placed upwardly against a rabbet or ledge medially of the side walls of the upper section of the case, and is secured thereto by screws or other convenient means. I denominate this plate as the conduit plate. Fixed on this plate are a considerable number of conduits 3 of a size and form adapted to serve as passages for disks, and these conduits register with and discharge downwardly through slots in the plate 2. These conduits so far at least, as they represent the means for casting a ballot or vote for party candidates, or for individual nominations, are arranged in columns (vertically of Fig. 3), and in rows laterally of these columns. A purpose of this arrangement, so far as voting is concerned, may be got by referring to Fig. 2 in which the ballot plate 4 is seen, which ballot plate is secured to the top of the upper section of the case over the conduits, the ballot plate being provided with slots that correspond to and register with the conduits 3 on the conduit plate. On this ballot plate it will be observed that there are four columns of slots, and that they are designated respectively "Democratic" "Republican" "Prohibition" "Individual nominations". For convenience of reference these columns may be respectively denominated D R P I. At the head of the party columns, that is the Democratic, Republican and Prohibition columns there is a slot and conduit indicated respectively as 5, 5ª 5ᵇ, the slots in the ballot plate 4 being understood to be merely a continuation of the registering conduits 3 on the conduit plate 2. There is no corresponding slot or conduit at the head of the individual nominations column. But in all of these columns the row of slots and conduits 6 6ª 6ᵇ 6ᶜ are arranged in a row laterally, as are also the several slots and conduits of the several columns succeeding (below in Fig. 2) the first complete row of slots and conduits.

Figure 7:
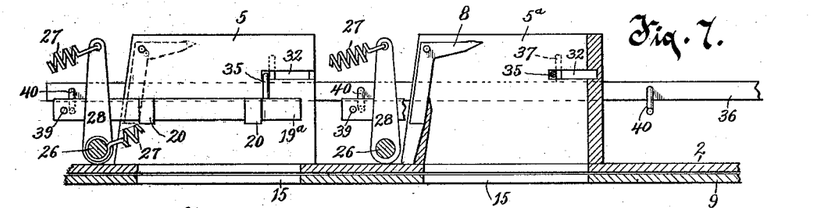
Fig. 7 is a view, partly in section, of two of the three conduits for disks shown near the top in Fig. 3.
Figure 8:
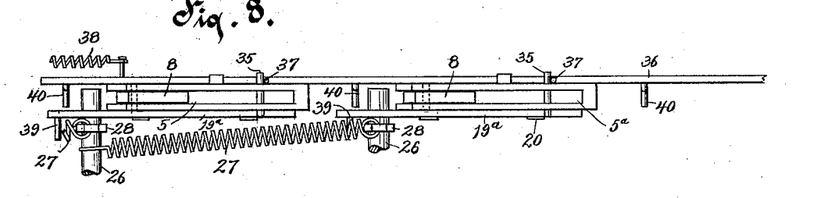
Fig. 8 is a plan of the same disk conduits shown in Fig. 7.
Figure 13:
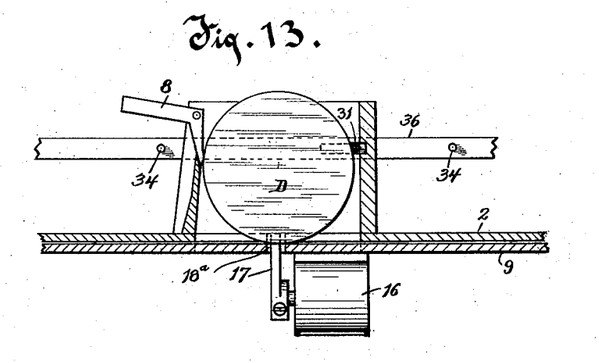
Fig. 13 is a vertical, longitudinal section of a disk conduit of the form shown in Fig. 9, with a disk in place in the conduit.
Figure 15:
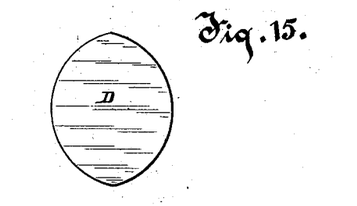
Fig. 15 shows a form, of many forms, of disk that can be used with this machine, in lieu of the circular form of disk shown in other figures.

On the ballot plate each row of slots from those marked 6 6ª 6ᵇ and 6ᶜ are understood to be the slot and conduit for receiving the ballot of the voter for the same officer, that is to say, the first row, as they are marked on the ballot plate (Fig. 2) are to receive a ballot for "governor", the second row for "lieutenant governor", the third row a ballot for "secretary of state", etc. The sets of slots of two each arranged at the foot of the several columns and marked respectively 7, 7ª 7ᵇ and 7ᶜ are provided for casting a vote, either yes or no, for any specific measure, as for or against an "amendment to the constitution". These sets of slots and conduits may be denominated specific measure conduits, and the three columns of slots and conduits, other than these specific measure conduits, may be denominated party ticket conduits, and the fourth column, other than the set of specific measure conduits may be denominated individual nomination conduits. Each of these conduits is of such size laterally as to permit of the easy passage through it, of a disk D, and is advisably of a height substantially equal to the diameter of the disk. These disks may be of metal, or of any suitable material, and are preferably circular or in true disk form, though other forms, as an oval (Fig. 15), or polygonal disk may be employed. Each conduit is provided with a conduit keeper 8 advisably in bell-crank form pivoted in an upper and outer corner of the conduit, which is open at that end therefor. When this keeper is locked in the position that is assumes normally by gravity as shown in Fig. 7, it closes the conduit to such extent that a disk can not be passed into the conduit. When the keeper is not locked, a disk may be forced into the conduit from the top as shown in Fig. 13, and the keeper 8 tilts and permits the passage of the disk through the conduit.

Figure 5:
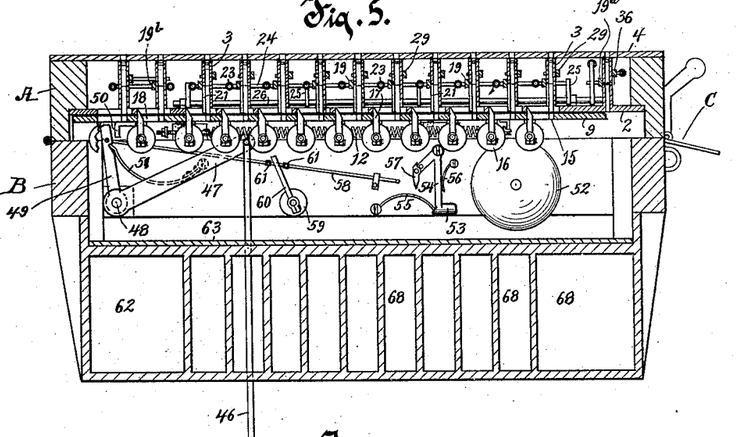
Fig. 5 is a longitudinal, vertical section on line 5—5 of Fig. 4.
Figure 6:
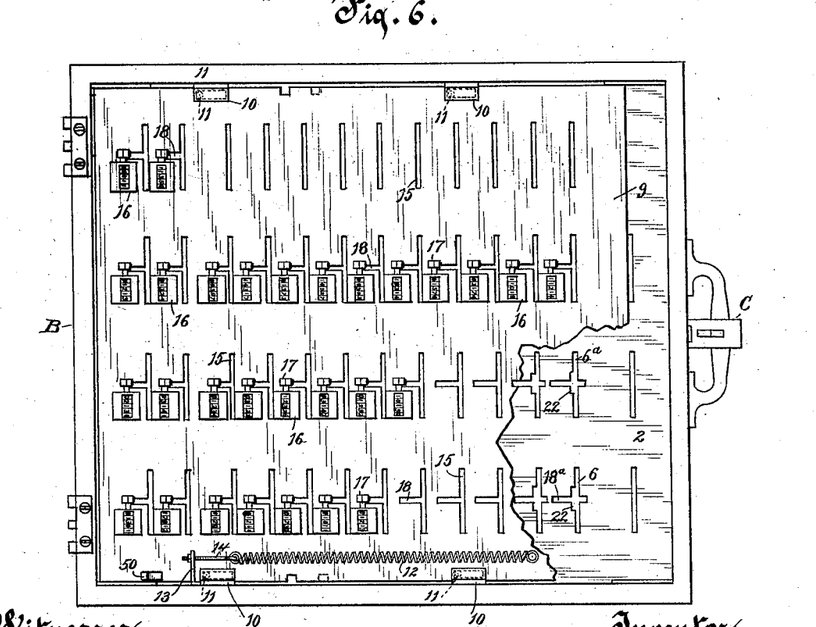
Fig. 6 is a plan, a part being broken away, of the under side of the upper portion of the apparatus removable on line 6—6 of Fig. 4.

Immediately under the conduit plate 2, there is a plate 9 substantially as large as the conduit plate, except that this plate 9 is a little shorter than the plate 2 (Fig. 5) providing for the movement of the plate 9, which I denominate the shutter plate. This plate 9 is supported and is movable endwise on ways 10, 10 which may be in the form of brackets secured to the side walls of the upper section of the case, the ways being preferably provided with bearing balls 11, providing for the easy movement of the plate on its ways. This shutter plate is provided with slots corresponding to and registering with the conduit slots in the conduit plate, except that at that end which is at the top in Figs. 2 and 3, the shutter plate ends at the conduits 5, 5ª 5ᵇ, and does not close these conduits, when the plate is in the position shown in Fig. 5, in which the other conduits are also open, or when, in other words, the slots in the shutter plate register with the slots in the conduit plate. The shutter plate is held in this position yieldingly by a spring 12 (Fig. 6) attached to the shutter plate and connected to the case by means of a bracket 13, and a screw threaded tension rod 14 connected to the spring and passing through the bracket. In this initial position of the shutter plate 9 in which it is held yieldingly by the spring 12 the slots 15, 15 therein correspond to and register with the slots of the several series 6, 6ª etc., and 7, 7ª etc. of the ballot plate, conduits, and the conduit plate, and the plate 9 terminates just at the edge of the slots 5, 5ª, 5ᵇ, so that these slots or conduits are also unobstructed by the plate 9. (Figs. 5, 6.) By shifting this shutter plate 9 (toward the right in Figs. 5 and 6) all of the conduits are closed by the plate, and means are provided, which are hereinafter described, for shifting the plate so as to close the conduits, while the voter is depositing his vote in the machine, and also means for shifting and locking the shutter plate when the votes of the election have all been cast.

For automatically counting the votes or ballots cast for party candidates, and for the affirmative or negative of specific measures, mechanism suitable therefor may be employed, and in my drawings I have shown counters 16, 16 adapted to count and register movements, which counters are substantially of the cyclometer form employed on bicycles and elsewhere for counting and registering revolutions or movements. These counters are mounted on the shutter 9, one alongside of each slot 15, of the slots that register with the conduits of the party columns and also with the conduits of the specific measure class. No counters are employed with the conduits of the individual nominations class. Each of these counters is provided with a radial actuating arm 17 fixed on the shaft of the counter, which arm projects through a slot 18 in the shutter plate 9 and into a registering slot in the conduit plate 2. These slots 18 in the shutter plate are at one side medially of and intercept the several slots 15 that are provided with counters. In the conduit plate 2 the corresponding slots 18$^a$ not only correspond to and register with the slots 18 in the plate 9, at one side of the conduit slots, but they extend across and beyond the conduit slots 6, 6$^a$ etc. in the conduit plate (Figs. 5, 6, 9, 10). Each counter is provided with a spring (not shown) for holding the arm 17 yieldingly in the position shown in Fig. 10, and means hereinafter described provide for engaging the counter arm 17 temporarily and releasably and tilting it when the shutter plate 9 is shifted reciprocally, whereby the counters are made to enumerate the shifting movement and register it by proper registering devices with numerals thereon.

Figures 9, 10, 11:
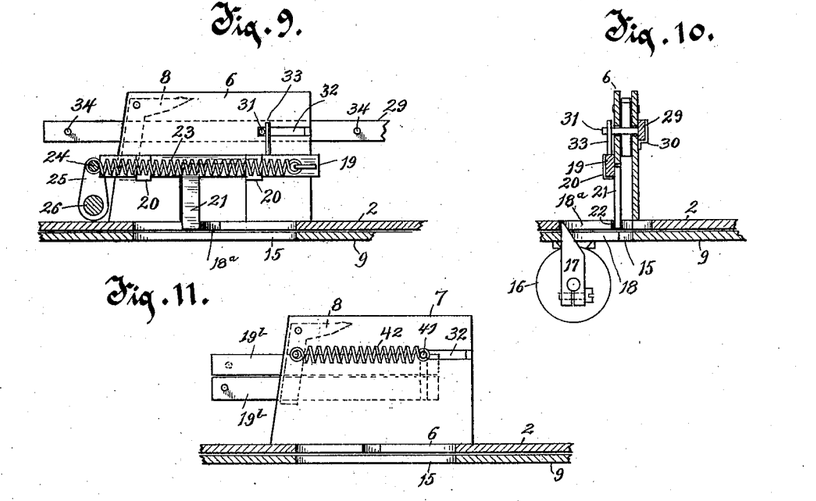
Fig. 9 is a view of one of the disk conduits located medially in Fig. 3.
Fig. 10 is a transverse, vertical section of the disk conduit shown in Fig. 9.
Fig. 11 is an elevation at one side of one set (two) of the four sets of disk conduits at the bottom in Fig. 3.

In connection with each of the conduits in the party columns D R and P and of all of the conduits in the specific measure class, with which counters are employed, there is provided an endwise shifting bar 19, 19$^a$ or 19$^b$ which may be denominated a locking bar mounted in ways therefor on the side of the conduits, which ways may be brackets 20, 20 fixed on the sides of the conduits. The bars 19, 19$^a$ 19$^b$ are shiftable endwise on these ways, and each bar 19 of the straight party columns is provided with a member 21 forming a part of the bar which projects therefrom medially alongside the conduit into an auxiliary slot 22 intercepting the slot 18$^a$ in the conduit plate, and into the path of the counter arm 17. (Figs. 6, 9, 10.) These locking bars 19 (except those on conduits 5, 5$^a$ and 5$^b$, with which no counters are employed) are each provided with a contracting spring 23, which is connected to the locking bar and to a wrist rod 24 on radial arms 25, 25 on a rock-shaft 26, mounted revolubly on the conduit plate. There is a rock-shaft 26 alongside the several conduits of each party column of conduits, and each rock-shaft is provided with a contracting spring 27 attached to a radial finger 28 on the rock-shaft and anchored in some manner to the conduit plate, by which the rock-shaft and its wrist rod are held yieldingly in the initial position shown best in Figs. 4, 7, 8 and 9, in which the wrist rod 24 is located close to the ends of the bars 19, and each member 21 of the bars 19 is against an end wall of a slot 22, at that end of the slot which is nearest the rock-shaft 26. As shown in the drawings and as advisably constructed, the member 21 of the bar 19, is at one side of the bar, and is located in the plane of one wall of a conduit, in a recess therefor in the wall of the conduit. (Figs. 9, 10.)

Figure 3:
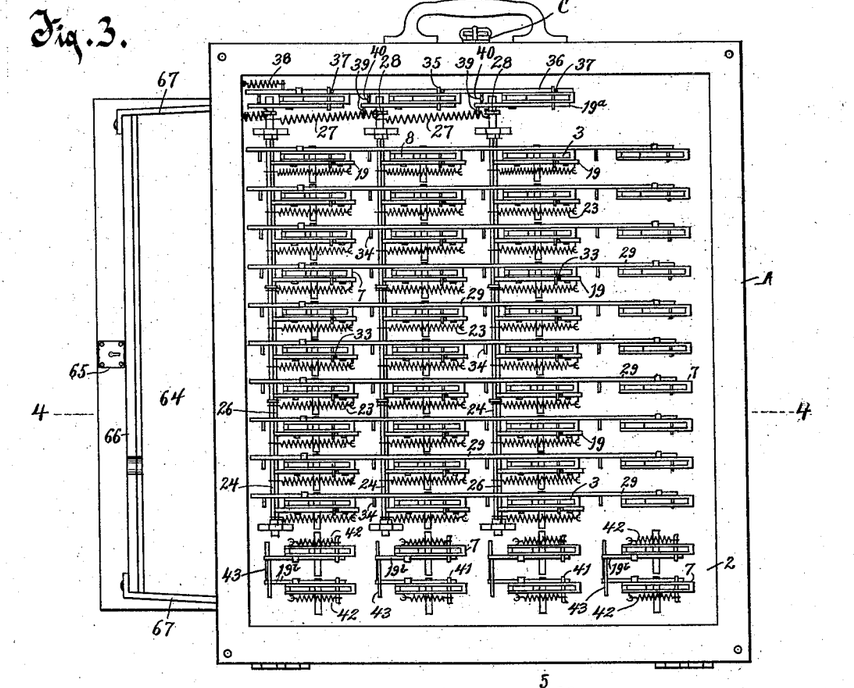
Fig. 3 is a plan view of the machine, the top slotted plate of Fig. 2 being removed, exhibiting the construction beneath that plate.

In connection with the conduits of the 6, 6$^a$ etc. class which represent the names of the several candidates for the several offices to be voted for, each row of conduits is provided with a coupling bar 29, which is mounted so as to be shiftable endwise on the sides of the several conduits of the row of conduits. The ways for mounting the bar 29 may be brackets 30, 30 fixed on the sides of two or more of the conduits. Each of these bars is provided with pins 31, each of which pins passes through slots 32 therefor in the walls of the conduit and is engaged by a post 33 fixed in the bar 19 (Figs. 9, 10). By this construction the several locking bars 19 in connection with each row of conduits are coupled together as shown in Figs. 3, 9 and 10, and in the initial positions thereof as shown in Figs. 3 and 9, the pin 31 is located across the passage of the disk through the conduit, at a distance from the end wall of the conduit, as most clearly shown in Fig. 9. By this construction, when a disk is inserted in the conduit, as illustrated in Fig. 13, the keeper 8 is uptilted and the coupling bar 29 and the locking bar 19 are shifted from the positions shown in Fig. 9, to those shown and indicated in Fig. 13, in connection with the particular conduit, through which the disk is passing. There are keeper pins 34, 34 projecting laterally from the coupling bar 29, which when the bar 29 is shifted endwise by forcing a disk into a conduit in the manner shown in Fig. 13 are advanced near to and in front of the downwardly projecting arms of the keepers 8, of the other conduits in the same row of conduits, whereby the keepers 8 in those other conduits are prevented from being tilted in the manner shown in Fig. 13, thus making it impossible so long as those keepers are thus locked by the coupling bar, for any one to insert a disk in any of the conduits thus closed by the keepers 8. It should be understood that on inserting a disk D into a conduit in the manner shown in Fig. 13, the entrance of the disk into the conduit immediately uptilts the keeper 8 in that conduit, so that it escapes from the pin 34 before the coupling bar is moved and is not held thereby, as the keepers on the other conduits in the same row are held by the shifted coupling bar 29 and the pins 34 thereon, as described.

The conduits 5, 5ª and 5ᵇ at the head of the columns of party ticket conduits, are, in connection with the mechanisms therewith, adapted, automatically in certain functions, to control the operations and capabilities of the other conduits and their mechanisms in the same columns, not including the conduits for votes for specific measures however, so that, by inserting a disk in any one of these conduits 5, 5ª or 5ᵇ, the entire party ticket may be voted. To this extent these conduits 5, 5ª and 5ᵇ with the mechanisms related thereto, may be said to be master conduits. In connection with each of these master conduits 5, 5ª and 5ᵇ, there is a bar 19ª which is mounted and is adapted to slide endwise on the conduit substantially like the bars 19 on other conduits, but these bars 19ª are not provided with the stop member 21, nor with a spring corresponding to 23. These bars 19ª are each provided with a pin 35 which extends up from the bar and laterally in slots therefor across the conduit, substantially as the pins 31 extend across other conduits. On the other side of these master conduits there is a coupling bar 36 mounted and slidable endwise on the conduits, which bar is provided with posts 37, 37 disposed to engage severally a pin 35. This coupling bar 36 is provided with a contracting spring 38 anchored to the case and adapted to hold the bar yieldingly in initial position, toward the left in Fig. 3. As the posts 37 engage the pins 35 on the distant sides thereof, the bars 19ª are held yieldingly at the limit of their travel in the same direction, the pins 35 being at that end of the slots 32 therefor in the conduits. Each of the bars 19ª is provided with a pin 39 projecting laterally therefrom so disposed that when a disk D is inserted in one of these master conduits and by its contact with and wedging effect on the pin 35 it shifts the bar 19ª endwise, the pin 39 engages the adjacent finger 28 on the rock-shaft 26, which is alongside this conduit and all of the conduits 6, 6ª etc. of the same columns, and so tilts the rock-shaft as to throw the wrist rod 24 against the adjacent ends of the locking bars 19 and when the disk has entered the conduit to the extent and substantially as shown in Fig. 13, it will have so moved the locking bars 19 that the members 21 will be across the slots 18ª and in the paths of the counter arms 17 so as to be adapted to be engaged thereby. The coupling bar 36 is also provided with pins 40 projecting laterally therefrom and so disposed that when a disk is inserted in any one of these master conduits, the disk first uptilts the keeper 8 in the manner shown in Fig. 13 and thereafter shifts the coupling bar 36 bringing the pins 40 up to and in front of the depending arms of the keepers 8, on the others of these master conduits, thereby closing the other master conduits against capability of taking a disk while the mechanism is so locked.

Figure 12:
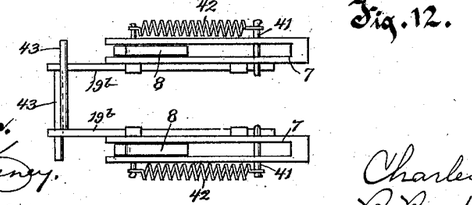
Fig. 12 is a top plan view of the set of disk conduits shown in Fig. 11.

In connection with the specific measure conduits 7, 7ª etc., which are arranged in sets of two, each conduit is provided with a bar 19ᵇ (Figs. 3, 11, 12) each mounted on the side of a conduit, and each provided with a pin 41 projecting laterally in slots therefor through the conduit, the pin being disposed with reference to the conduit substantially as the pins 31 and 35 are disposed with reference to other conduits. A contracting spring 42 attached to the pin 41, is anchored to the conduit, and is adapted to hold the bar 19ᵇ at the limit of its travel in one direction, as shown in Figs. 11 and 12. These bars 19ᵇ are also each provided with an elongated keeper-locking pin 43, so disposed that when a disk is inserted in either one of the conduits 7, the bar 19ᵇ of that conduit is shifted endwise to such extent as to bring the pin 43 on the shifted bar up in front of the downwardly projecting arm of the keeper 8 of the other conduit of the set, and lock it in position closing the conduit so that no disk can be inserted in that other conduit, while a disk is in the conduit of the set selected for inserting a disk.

Figures 1, 14:
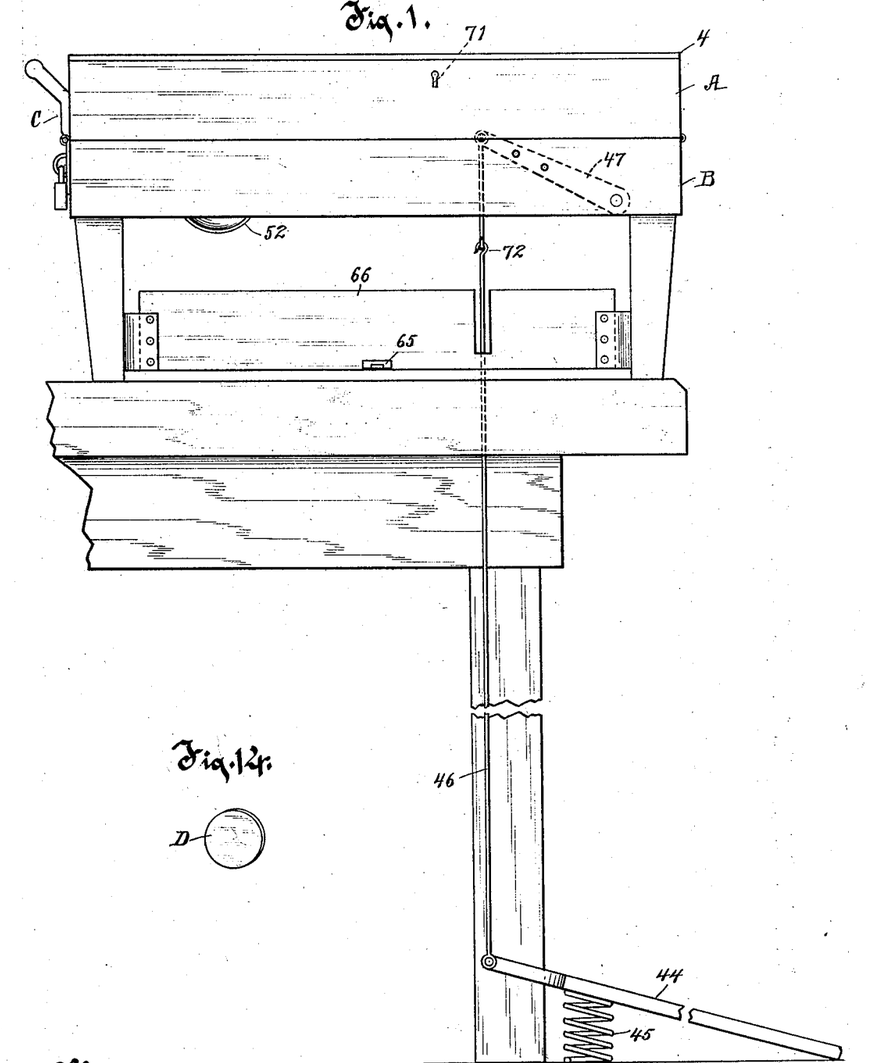
Figure 1 is a side elevation of a case for my improved voting machine, in connection with a fragment of a table or stationary support for the case; and showing a movable platform (broken away medially) on which the voter stands while using the machine.
Fig. 14 is a disk of the most desirable form adapted to be employed by a voter for casting his vote with this machine; the disk being here represented of a size conforming with the scale of the machine as shown in Figs. 1 to 6 inclusive.

It has herein before been stated that the shutter plate 9 is initially in the position shown clearly in Figs. 5 and 6, in which the disk conduits are open through the ballot plate 4, through the conduits and the conduit plate, and through the therewith registering shutter plate 9. But when this machine is being employed by a voter for casting his vote, that is for balloting for the several candidates or measures for which he desires to cast his vote, the shutter plate must be shifted so as to close the conduits, that the voter may load the machine with the necessary disks or ballots for casting the entire vote he is entitled to cast at any election. For this purpose the voting machine is placed in a booth or stall to which a single voter only may have access at one time, and in this booth or stall there is a platform 44 (Fig. 1) so disposed that the voter who comes to the machine for voting will stand on the platform and thereby depress it against the action of a spring 45 that supports it normally yieldingly. This platform is connected by a rod 46 to a crank arm 47 on a rock-shaft 48 mounted in the case, which rock-shaft has a radial arm 49 adapted to engage a lug 50 fixed on the shutter plate 9. A spring 51 aids in holding the rock-shaft and its radial arm 49 in the initial position shown in Fig. 5. The construction is such that when the voter steps on the platform 44 and depresses it, the shutter plate 9 is shifted endwise taking the slots therein out of registration with the conduit slots in the conduit plate 2, and closing the conduits against the passage of disks through them. This condition continues so long as the voter stands on the platform, and when he steps off the platform the platform is lifted by the spring 45, and the shutter plate is returned to initial position by the spring 12.

In connection with the movement of the platform and the shifting of the shutter plate an alarm bell 52 is provided, which alarm bell is mounted on the inside of the case, and a hammer 53 on the free end of a cranked lever 54 is adapted to strike the bell and sound it. For this purpose the cranked arm 54 is pivoted on the case and is provided with a strong spring 55 adapted to throw the hammer against the bell, and with a lighter spring 56 adapted to hold the hammer yieldingly a little away from the bell. A tripping dog 57 is pivoted on the outer arm of the crank lever 54. A rod 58 attached at its distant end to the radial arm 49 is provided at its free end with a hook, which when the rod is shifted endwise by the tilting of the radial arm 49, contacts in its forward movement with the tripping dog 57 and passes it, and on its return movement engages the tripping dog and swings the hammer 53 back until the hoop slips off the tripping dog, when the hammer under the action of the spring 55 strikes the bell. The rod 58 is supported movably endwise, in ways or brackets therefor on the case. For counting the number of persons who vote with this machine at an election, I provide a counter 59 mounted on the case, which counter may be of the same general character as those marked 16, which counter is provided with a radial arm 60 disposed to engage and be controlled by pins or collars 61, 61 on the rod 58, one at each side thereof, whereby as the platform is depressed and raised and the rod 58 correspondingly shifted, the counter will be actuated to number and register 1.

Figure 2:
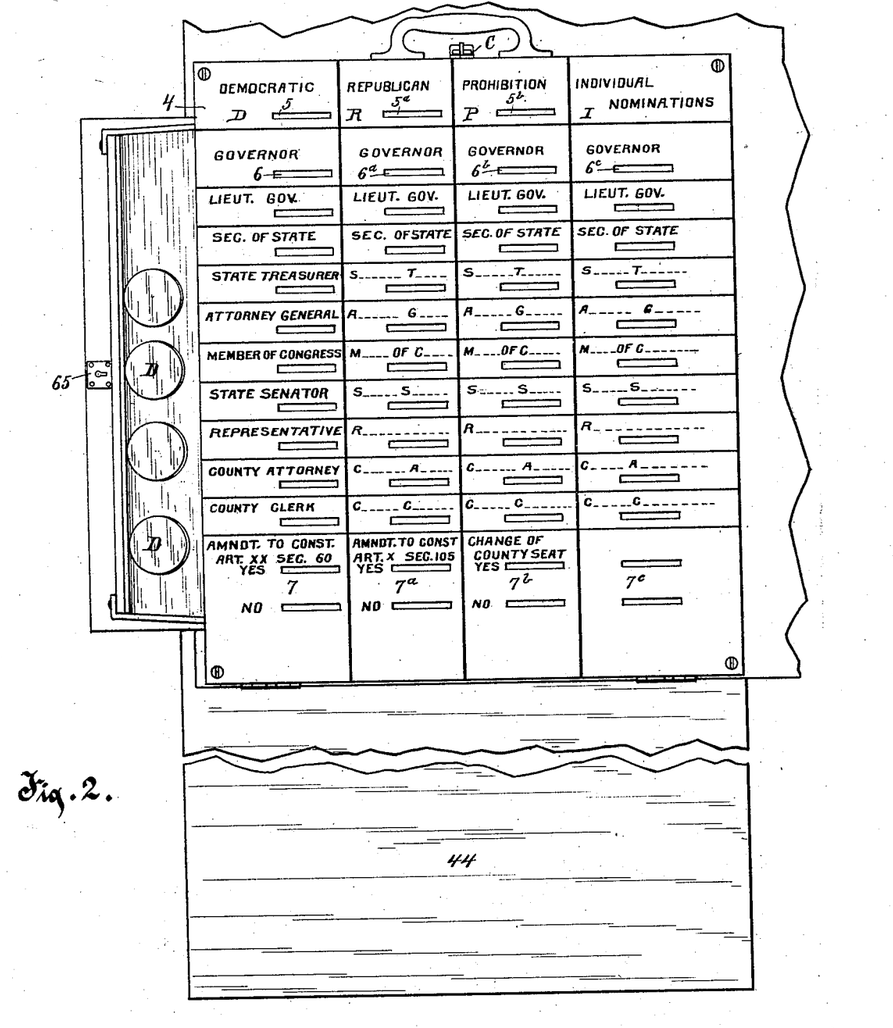
Fig. 2 is a top plan view of the voting machine and platform (the platform being broken away medially) with a fragment of the supporting means.
Figure 4:
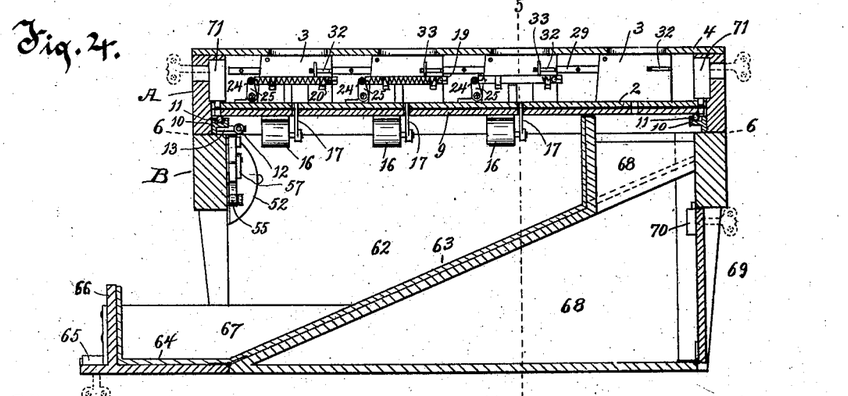
Fig. 4 is a transverse, vertical section on line 4—4 of Fig. 3.

The lower section B of the case besides being a portion of the inclosing case of the machine, and besides being the support for the upper section A, is divided into compartments and serves as a receptacle (with numerous compartments), for the disks or ballots as cast by the voter. There is a general compartment 62 provided with an inclined floor 63 descending toward one side of the case, a portion 64 of which side is hinged at the bottom to the floor of the compartment and the bottom of the case and is provided with a lock and key 65 adapted to secure the free edge of this leaf portion of the wall, to the adjacent edge of the side wall of the section of the case, when the leaf is closed up. This leaf is also provided with an inwardly projecting ledge or temporary wall 66, which when the leaf is let down in the manner shown in Figs. 2, 3 and 4 serves as an outer wall for the tray formed thereby in connection with the general compartment 62. Collapsible end walls 67, 67 are provided for this tray, constructed advisably of webbing secured to the ends of the temporary walls 66, and to the edges of the floor 63, so that when the leaf 64 is let down as shown in Figs. 2, 3 and 4, a tray is provided at the foot of the inclined floor 63, for receiving the disks or ballots as they roll down the floor 63, and holding them in accessible and convenient position for being taken up by the voter to be placed in the conduits for casting his vote. This general compartment 62 is beneath, and is adapted to take the disks or ballots from all the conduits, except only from the conduits of the column I (individual nominations) in the group or class of conduits $6^c$. For receiving and holding the disks or ballots cast through these conduits $6^c$ (individual nominations), and holding the disks or ballots separately until the close of the election and until they are removed and counted, there are a series of individual compartments 68, 68, arranged in section B, below the conduits in the column I and of the group $6^c$. These compartments 68 besides being immediately below the conduits of the group $6^c$ as stated, also extend laterally under the inclined floor 63, so as to give them greater capacity. A portion of the other side wall of the lower section of the case is in the form of a leaf or door 69 hinged to the floor of the case and provided with a lock and key 70 adapted to secure its upper edge releasably to the case, whereby access can be had to these individual compartments for removing the disks or ballots therefrom. This leaf or door extends substantially the entire length of the case. As herein before stated these conduits of the group $6^c$ are provided for permitting the voter to cast a ballot, by disk, for any person of his preference for any office to be voted for, independently of a party ticket, and to enable the voter to do this, the ballot, which with this machine is a disk, must be of some material that the voter can write or print the name of the person on, for whom he desires to cast his vote. A disk made of white or light colored papier mâché or any other material that could be readily formed into the proper shape, and on which a name could be written or printed would be suitable for this purpose. Such disk ballot could be cast in these individual nominations conduits ($6^c$) and there being no automatic counters in connection with these conduits, the disk ballots are received and held in the individual compartments 68 until they are removed and counted at the close of the election. The disks used for casting a vote through the several other conduits, are at the completion of the casting of his vote by any voter and his stepping off the platform 44 at once discharged into the general compartment 62, and may be used immediately afterward by each succeeding voter for casting his vote.

At the close of the election a person in charge of the voting machine may step on the platform 44 thereby shifting the shutter plate 9 so as to close all the disk conduits, and then by means of the locks 71, 71 on the case throw the bolts of the locks into bolt holes therefor in the shutter plate thereby closing the conduits, against any capability of either receiving or permitting of the removal of any disk ballot. There are two of these locks, and the key of one can be given to one officer and the other key to another officer of the election board, so as far as possible to provide against tampering with the ballots or counting mechanism. For convenience of handling the voting machine, the rod 46 may be made in two parts coupled together at 72, and at the close of the voting the rod can be separated at this point. The tray or leaf 64 is then closed up and locked and the machine becomes a tightly inclosed case, as it will be understood that the leaf or door 69 is closed and locked before the election begins, as also the upper section A of the case is locked to the lower section B.

When my improved machine is to be used at an election, the ballot plate 4 may be prepared therefor by having the names of the parties printed thereon at the heads of straight party ticket columns; "Individual nominations" or some other proper designation at the head of the other column; and other required or proper statements may be printed on the plate in connection with the "Separate measure" conduits, so as to inform the voter properly and sufficiently of the party ticket and candidates and measures for which he desires to vote, and these several columns and the space in which are the separate measure conduits, may be painted in different colors so that each straight party column will be indicated throughout by one color, and the separate measure conduits will be indicated by a space of another color, etc. And it should also be understood that while in the drawings I have shown only three columns for straight party tickets, and one column for individual nominations, my invention is not limited to a machine having only so many columns or so many conduits as shown in the drawings herewith, but the columns and conduits may be increased in number to such extent as desired. With this general preparation of the ballot plate, the top section A of the case is locked to the lower section, the leaf or door 69 is closed and locked, the leaf or tray 64 is opened, and the platform 44 by its rod 46 is connected to the crank arm 47, whereby the platform is put in operative relation with the shutter 9. The machine is then ready to receive disk ballots. A supply of these disk ballots are placed in the tray of the compartment 62 so as to be conveniently obtainable, by the voter. The ballots that are to be cast for individual nominations, must as herein before described, be of such material as to enable the voter to write the name of his candidate thereon. The voter coming into the booth or stall where the machine is located, will step on the platform 44 thereby shifting the shutter plate 9 so as to close all the conduits, and he will remain in this position until he has completed casting his vote. If he desires to cast a straight party ticket vote, he will insert a disk in one of the conduits 5, $5^a$ or $5^b$ and push it down in the conduit to the extent shown in Fig. 13, when it will rest on the shutter plate 9. As this disk is thus forced down into the conduit, it will shift the bar $19^a$ in connection with that conduit whereby the coupling bar 36 will also be shifted endwise locking all the keepers in that row; and at the same time by the shifting of bar $19^a$ and the impingement of pin 39 upon lever 28 the rock-shaft 26 alongside that conduit and all the conduits of the straight party ticket in the same column, will be oscillated to such extent as to throw the wrist rod 24 in front of the keepers 8 of all of the conduits in that party ticket column, so that no disk ballot can be cast for any individual candidate in that particular party column. But if the voter desires to cast his vote for any particular candidate of another party or individual, as for instance for attorney general, he can place a disk ballot in a conduit of the attorney general row of conduits in either of the other columns, and force it down in the conduit against the shutter plate. Thereby the coupling bar 29 of that row of conduits will be shifted bringing the pins 34 up in front of the keepers in all the other conduits in that row, so that no other disk ballot can be placed in a conduit for a candidate for the same office. The voter can also vote for any other specific candidate in the same manner as for the attorney general, and with the same result so far as locking the other conduits in the same row of conduits that is for the same office. The voter can then vote for any one or all of the specific measures, either for or against it, by inserting a disk ballot in the conduit "Yes", or the conduit "No" in connection with the measure desired to be voted upon, and it will be understood that when the disk is inserted in the conduit down against the shutter plate, it will shift the bar $19^b$ on that conduit so that the pin 43 thereon will be brought in front of the keeper 8 on the other conduit of the set, thus closing that other conduit against the possibility of any disk being inserted in it and thus preventing the voter from casting a ballot both for and against any measure. When the voter has thus loaded the conduits with disks representing the entire vote he desires to cast, he steps off the platform 44 and immediately the shutter plate 9 is shifted permitting the disks to be discharged into the compartments below. It will be noted that the coupling bars on these several rows of conduits are so located that the pins projecting laterally therefrom across the conduits (31, 35, 41) are engaged wedgingly by the disk as it is pushed into the conduit, whereby the coupling bars are shifted, and that when the disk has reached its seat on the shutter 9, these pins are above the horizontal plane of the center of the disk, so that when the disks are no longer supported by the shutter plate, the action of the springs on the coupling bars against the disk wedgingly forced the disk downwardly, discharging it from the conduit into the compartment below. The keepers 8 are also so formed and mounted, that they serve as a horizontally opposite and counteracting bearing on the disk, opposite these pins on the coupling bars (Fig. 13).

It must also be understood that when the voter steps on the platform 44 and shifts the shutter plate 9, the counters 16 are carried therewith to such extent that their arms 17 are shifted in the slots therefor in the conduit plate to the distant sides of the conduit slots, and that when a disk is inserted in any one of the master conduits 5, 5ᵃ or 5ᵇ, the locking bars 19 of all the conduits of the straight party ticket of that column are shifted so as to move the member 21 on each bar from its initial position (Fig. 9) at one side of the slot 18ᵃ to a second position, across the slot 18ᵃ and in the path of the counter arm 17, so that when the shutter plate is released and returns to its initial position, the bars 19 still remaining in the positions indicated, the counter arms 17 will engage and be tripped by the members 21 thus actuating the counters in connection with this entire party ticket. But if the voter after placing his disk ballot in the master conduit 5, 5ᵃ or 5ᵇ, whereby he would vote for the entire party ticket, desires to vote for some candidate of another party, or an individual not a party candidate for any particular office, as for attorney general, he places his disk in one of the other conduits for attorney general and pushes it down against the shutter, and thereby shifts the coupling bar 29 in connection with that row of conduits to such extent as to shift the member 21 on the several bars 19 of that row, to a third position on the distant side of the slot 18ᵃ thereby moving the member 21 out of the path of the counter arm 17 in the straight party column, so that the counter arm 17 in that column will not be engaged thereby, and in fact moving the member 21 in each of the conduits of this row, beyond the slot 18ᵃ of each of the conduits, but the disk itself which has been inserted in this other conduit becomes a stop in this other conduit, which when the shutter 9 is returned to its initial position, engages the counter arm 17, and actuates the counter in connection with this other conduit or ballot, thus counting a ballot for attorney general in this other column, but not in the straight party column. In the same manner a voter may cast his ballot for any other candidate, and have it registered and counted automatically, in the manner described, or may cast it for an individual candidate, and have his ballot deposited in a compartment therefor in the receptacle, which ballot will be counted by the election board by removing the ballots from the individual compartments therefor.

It may be noted as a desirable feature of this machine, that if a voter inserts the disk in a wrong conduit, it may be removed therefrom and placed in the intended and proper conduit, at any time before the voter steps off the platform shifting the shutter 9 and permitting the disk to pass into the receptacle below beyond recovery.

What I claim as my invention is:

1. In a voting machine, a plurality of stationary conduits adapted to receive and permit the passage therethrough of disks, a slidable slotted registering shutter at the discharge of the conduits adapted by being shifted from registration to close the conduits temporarily during the process of loading the conduits with disks, a depressible platform connected operatively to the shutter and disposed to be stepped on and thereby depressed by the voter as he comes to the voting machine whereby the shutter is moved and the conduits are closed while the voter holds the platform down.

2. In a voting machine, a plurality of stationary disk-taking conduits, a slidable apertured registering shutter at the discharge of the conduits held in initial position by a spring, a rock-shaft having an arm adapted to engage and move the shutter against the action of the spring, and means for oscillating the rock-shaft.

3. In a voting machine, a plurality of stationary disk taking conduits, a registering apertured slidable shutter held in initial position by a spring, a rock-shaft having an arm adapted to engage and move the shutter against the action of the spring, means for oscillating the rock-shaft, an alarm bell, a swinging spring-actuated bell hammer, and means actuated by the oscillating rock-shaft adapted to trip the hammer and permit it to strike the bell.
4. In a voting machine, a supporting frame, two plates, a plurality of counters on one of the plates the arms of which counters project through slots in that plate, means on the other plate adapted on the moving of a plate to engage said arms and move them thereby actuating the counters, and means for moving said plate.

5. In a voting machine, a supporting frame, two plates, counters representing inscribed candidates attached to one of the plates said counters having arms which extend through slots in that plate, and means on the other plate for actuating said arms and counters by the movement of a plate, and means on said plates related to each office to be voted for for receiving and passing into individual compartments detached written ballots for non-inscribed candidates.

6. In a voting machine, a case, a conduit plate mounted in and across the case, conduits on said plate registering with slots in the plate which slots form portions of the conduit passages, a shutter plate provided with slots initially registering with the slots in the conduit plate, ways on which the shutter plate is mounted movable edgewise alongside the conduit plate to such extent as to put the slots therein out of registration with the slots in the conduit plate and close them, and a spring adapted to hold the shutter plate in initial position yieldingly.

7. In a voting machine, a conduit plate provided with conduits on and leading through slots in the plate and adapted to receive disks therein, and a shutter plate alongside the conduit plate and provided with slots initially registering with the conduits of the conduit plate, the plates being so disposed that by a movement of one of them the conduits are synchronously all closed by the shutter plate at the discharging ends thereof.

8. In a voting machine, a conduit plate provided with disk-taking conduits leading through the plate, a shiftable shutter plate alongside the conduit plate and provided with slots registering with the conduits of the conduit plate, means adapted to hold the shutter plate in initial registering position yieldingly and to return it to initial position when shifted therefrom and released, counters on the shutter plate, and means carried by the conduit plate adapted to engage the arms of the counters and actuate the counters when the shutter plate returns to initial position after being shifted therefrom.

9. In a voting machine, a conduit plate provided with disk-taking conduits leading through the plate, a shiftable shutter plate alongside the conduit plate and provided with slots registering with the conduits of the conduit plate, means adapted to hold the shutter plate in initial registering position yieldingly and to return it to initial position when shifted therefrom and released, counters on the shutter plate, and disks fitted for and adapted to be received in said conduits and held on the shifted shutter plate and, when the shutter plate is returned to position, to engage and trip the arms of the counters belonging to the conduits having such disks therein.

10. In a voting machine, a conduit plate provided with a plurality of disk-taking conduits arranged in a column and leading through the plate, a shiftable shutter plate alongside the conduit plate, counters on the shutter plate belonging to the conduits, means for returning the shifted shutter plate when released to initial position, slidable locking bars on the conduits of the column other than the master conduit, said locking bars each having a member disposed to be placed by the shifting of the bar in the path of a swinging arm of the counter, a disk adapted to be placed in the master conduit, and means actuated by the disk being placed in the master conduit to shift the locking bars of all the other conduits of the column into the paths of the swinging arms on the counters.

11. In a voting machine, a plurality of disk-conduits, swinging keepers in those conduits adapted when locked in normal position to prevent the insertion of disks in those conduits, and means connected with the conduits but operating upon said keepers whereby by inserting a disk in any one of said conduits the keepers of one or more other conduits are locked in normal position so long as the initial disk remains in the first conduit.

12. In a voting machine, a plurality of disk conduits, keepers mounted movably in some or all of the conduits adapted when locked in initial position to prevent the insertion of disks in those conduits having the keepers, a bar movable alongside each conduit such bar being provided with a pin extending in slots therefor across the conduit, the pin being adapted to be engaged and moved with its bar by inserting a disk in the conduit, and means actuated by the moving of said bar to lock the keeper in each of the other conduits.

13. In a voting machine, a plurality of disk conduits arranged in a row in alinement, keepers mounted movably in the conduits adapted when locked in initial position to prevent the insertion of disks therein, a movable bar alongside each conduit held yieldingly in initial position, a movable coupling bar alongside the several conduits of the row of conduits and provided with means disposed to engage and lock the keepers in initial position when the bar is moved up thereto before such keeper is moved away from initial position, and means extending in slots therefor across the conduits coupling up the two movable bars so as to compel concurrent movement thereof when actuated by a disk inserted in one of the conduits of the row and lock the keepers in the conduits of the row other than that receiving the disk.

14. In a voting machine, a plurality of disk conduits arranged in a column one of said conduits being a master conduit, movable keepers in conduits of the column, means adjacent to the conduits adapted to be actuated by the insertion of a disk in the master conduit whereby the keepers in the other conduits are locked in position closing the conduits against inserting a disk in any of those thus closed conduits.

15. In a voting machine, a plurality of disk conduits arranged in a column one of said conduits being a master conduit, movable keepers in conduits of the column, a rock-shaft alongside the conduits, a wrist rod mounted in radial arms on the rock-shaft so as to be capable of being swung up to lock the keepers in initial position, and means related to the master conduit and connected to the rock-shaft whereby by the insertion of a disk in the master conduit the rock-shaft will be oscillated bringing the wrist rod into position to lock the keepers.

16. In a voting machine, a plurality of disk conduits arranged in a column one of said conduits being a master conduit, movable keepers in conduits of the column, a rock-shaft alongside the conduits, a wrist rod mounted in radial arms on the rock-shaft and so as to be capable of being swung up to lock the keepers in initial position, a movable locking bar on each of the conduits other than the master conduit adapted to be engaged and shifted by the swinging wrist rod on the rock-shaft, and a series of shiftable counters each provided with a tilting arm adapted to be engaged by the shifted locking bar thus placed in the path of the tilting arm of the shifting counter.

17. In a voting machine, a plurality of disk conduits arranged in a column, one of said conduits being a master conduit, a rock-shaft alongside the conduits, a wrist rod on radial arms on the rock-shaft, a movable locking bar on each of the conduits other than the master conduit arranged to be engaged and moved endwise by the wrist rod on the rock-shaft, springs connecting the movable locking bars yieldingly to the wrist rod, means related to the master conduit and connected to the rock-shaft adapted by the insertion of a disk in the master conduit to oscillate the rock-shaft and move the locking bars, and counters provided with tilting actuating arms mounted shiftably so that when shifted the arms of the counters will be engaged and tilted by the locking bars.

18. In a voting machine, a plurality of disk conduits arranged in a row in alinement and adapted to receive disks therein edgewise, a spring-held shiftable locking bar alongside each conduit, a shiftable coupling bar alongside the several conduits of the row, means extending across the conduits adapted to connect it operatively with each of said locking bars and compel co-incident movements of the coupling bar and locking bars, shiftable counters related to the conduits and provided with actuating arms, and disks adapted singly to be inserted and held temporarily in a conduit across the path of the actuating arm of a counter whereby the arm of a shifting counter is engaged and tilted.

19. In a voting machine, a plurality of disk conduits arranged in a row in alinement and adapted to receive disks therein edgewise, swinging keepers mounted in the conduits adapted when locked in initial position to close the conduits against receiving disks therein, a spring-held shiftable locking bar alongside each conduit adapted when in a shifted second position to intercept and tilt a shifting counter arm, a shiftable coupling bar alongside the several conduits of the row, means extending across the conduits severally and adapted to connect the coupling bar and the locking bars operatively and compel coincident movements of the coupling bar and the locking bars, means on the coupling bar adapted to engage the non-tilting keepers and lock them in position closing their conduits against receiving disks therein when the locking bars are shifted to a third position, and a disk adapted to be inserted in a conduit of the row of conduits and shift the coupling bar and the locking bars bringing the locking bars to said third position and locking the keepers, the disk being thereby placed in position to itself intercept the tilting arm of a shifting counter.

20. In a voting machine, a supporting case, a conduit plate with conduit slots, a plurality of conduits on the plate registering with the slots, the conduits being arranged in columns, disks adapted to be placed in and passed through the conduits, a movable shutter-plate having slots registering with the conduits, means for shifting the shutter-plate closing the conduits, counters on the shutter-plate adjacent and related to the conduits except to a master conduit in each column, means connected with the conduits and disposed by the insertion of a disk in a master conduit for engaging and actuating each counter of the conduit column upon the reshifting of the shutter-plate.

21. In a voting machine, a case, a conduit plate fixed in the case and having conduit slots therein and conduits thereon registering with the slots and arranged in columns and transverse rows, disks adapted to be placed in and passed through the conduits, a movable spring-held shutter plate having slots registering with the conduits, means for shifting the shutter plate closing the conduits at their lower ends, keepers for closing the conduits at their upper ends, counters on the shutter adjacent and related to the conduits except at a master conduit of each column, a spring-held rock-shaft with a wrist rod alongside each column of conduits adapted to be shifted to lock the keepers, a slidable locking bar on each conduit, a shiftable coupling bar alongside each transverse row of conduits, means coupling the coupling bar to the several locking bars on a row of conduits whereby by the insertion of a disk in a master conduit the keepers will be locked in that column of conduits and by inserting a disk in a conduit of any row of conduits but in another column the coupling bar of that row of conduits will be shifted locking the keepers of the other conduits in that row of conduits.

22. In a voting machine, a case, a disk-receiving conduit, means for automatically closing the conduit by the voter during his presence at the voting machine, a counter, and means actuated by said first enumerated means for operating said counter.

23. In a voting machine, a case, disk-receiving and transmitting conduits mounted in the case, a general compartment in the case for receiving and holding disks transmitted by a number of the conduits, compartments for receiving and holding separately disks transmitted through other conduits severally, and a door in the case provided for access to these separate disk-holding compartments.

24. In a voting machine a supporting and containing frame, two plates either of which is reciprocally movable as to the other, counters attached to one of the plates, disk conduits attached to the other of said plates, disks adapted to be inserted in the conduits, and means disposed by the inserted disks for actuating the counters upon the reciprocal movement of the plates.

25. In a voting machine, a supporting and containing case, two plates movable one as to the other to one of which plates counters are attached and to the other of which plates means are attached for actuating the counters, and voting disks adapted to disposing the means for actuating the counters.

26. In a voting machine, disk ballots, two plates movable one as to the other, to one of which plates are attached counters whose actuating arms extend through registering slots in both plates and to the other of which plates are attached means, disposed by the disk ballots, for intercepting the path of said arms of the counters at the shifting of the plates, and means for shifting the plates.

27. In a voting machine a supporting and containing case, two plates movable reciprocally one as to the other, on one of which plates is mounted counting devices and to the other of which plates are attached means for intercepting and actuating the counters by the reciprocal action of the plates, and disks adapted by their insertion in the machine to dispose the parts of said intercepting and actuating means.

28. In combination, means for taking, holding temporarily and discharging synchronously a plurality of inserted disks, said disks, counting devices, and means disposed by the inserted disks for actuating said counting devices.

29. In a voting machine, a supporting and containing case, two plates reciprocally movable one as to the other, to one of which plates are attached disk conduits, disks adapted to be inserted in said conduits, and counters attached to the other of said plates adapted to be actuated by the inserted disks in the reciprocal movement of the plates.

30. In a mechanical voting device, a ballot conduit consisting of retaining and guiding walls, and a tilting keeper mounted yieldingly near and projecting into the ballot passage-way of the conduit the keeper when in locked position being adapted to prevent the insertion of a ballot in the conduit but when not so locked to yield and allow the ballot to pass into the conduit.

31. In a mechanical voting device, a ballot conduit consisting of retaining and guiding walls and a tilting keeper having diverging arms mounted pivotally adjacent to the passage-way of the conduit one arm of the keeper being held across the passage-way of the conduit by the weight of the other and heavier arm, the keeper being adapted when in locked initial position to prevent the insertion of a ballot into the conduit but when not so locked to be tilted by the insertion of a ballot to allow the ballot to pass into the conduit.

32. A voting machine, comprising a supporting and containing frame, two slotted plates one reciprocally movable as to the other, counting devices attached to the lower plate the actuating arms of which protrude above the upper plate through constantly registering slots in both plates, and disk conduits on the upper plate each conduit having a way or slot transversely through it to admit of the free passage of the counter arm when the conduit is emptied and the plates are shifted, the counter arm being adapted to be projected and held in the transverse slot by the reciprocable movement of the plates under the action of a disk inserted forcibly into the slots in the plates.

33. In a voting machine, a containing and supporting frame provided with two slotted plates one slidable upon the other, counters attached to the lower plate whose actuating arms extend through constantly registering slots in both plates into the paths of disk conduits, disk conduits attached to the upper plate said disk conduits having transverse slots to allow the free passage of the counter arms when not obstructed, disks adapted to be inserted into the conduits and to obstruct the transverse slots and actuate the counter arms upon the shifting of the plates, and means for shifting the plates.

34. In a voting machine, a containing and supporting frame, two plates movable one above the other having constantly registering slots in both plates and cross slots that pass into and out of register as a plate is shifted, counters attached to the lower plate and provided with actuating arms extending into said slots in the plates, disk conduits attached to the upper plate co-incident with the cross slots of that plate said conduits being adapted to receive and hold voting disks when the cross slots are out of register and to carry the disks against the arms of the counters and actuate them when the plates are shifted to the extent of bringing the cross slots into register and allowing the disks to drop through both plates, and means for shifting the plates.

35. In a voting machine, a supporting and containing frame, two plates reciprocally movable one upon the other having constantly registering slots in both plates, counters attached to the lower plate and having actuating arms extending into said slots, slidable stops attached to the upper plate adapted to be moved in and out of the paths of the actuating arms of the counters, means for disposing the stops so as to intercept and actuate the arms of the counters upon the reciprocal shifting of the plates, and means for shifting a plate.

36. A voting machine, comprising a containing and supporting frame, two slotted plates reciprocally slidable one upon the other, counters attached to the lower plate the actuating arms of which counters extend through registering slots and slightly above the plane of the upper plate, and movable stops attached to the upper plate for engaging the arms of the counters upon the reciprocal movement of the plates, and means for shifting a plate.

37. In a voting machine, a supporting and containing frame, two plates reciprocally movable one above the other and having constantly registering slots in both plates, counters attached to the lower plate having arms extending through said slots said counters being arranged in a column, slidable stops attached to the upper plate adapted to be moved into the paths of the counter arms and to actuate them upon the shifting of the plates, a lever extending along the column to which the slidable stops are connected, the master disk conduit in which means are provided for moving the lever and thus throwing the stops in to the paths of the counter arms by the insertion of a voting disk in said master conduit, and means for shifting a plate.

38. In a voting machine, two plates movable one upon the other, counters arranged in a column attached to the lower plate the actuating arms of which counters extend through constantly registering slots in both plates, slidable stops attached to the upper plate adapted to be moved into the paths of the counter arms, a common lever to which all the slidable stops in the column are attached, a master disk conduit at the head of the column provided with means for actuating the lever and moving the stops into the paths of the counter arms by the insertion of a voting disk in the master conduit, and means for shifting the plates whereby the stops engage the counter arms and actuate them.

39. In a voting machine, a plurality of disk conduits arranged in rows said conduits being provided with lockable tilting keepers, a sliding bar extending along each row of conduits, means attached to the bar for simultaneously locking all the untilted keepers of the row by the sliding of the bar, and means related to the conduits and connected with the bar for sliding the bar by the insertion of a disk in any conduit of the row.

40. In a voting machine, voting disks, a plurality of disk conduits arranged in columns each conduit being provided with a lockable tilting keeper adapted when locked to prevent the insertion of a voting disk, counters whose actuating arms travel in transverse slots through the conduits, sliding stops adapted to cover these transverse slots, a rocking lever extending along the column to which the sliding stops are connected, and a master conduit in which means are provided whereby by the insertion of a disk in such master conduit the lever is operated to move the sliding stops into obstruction of the transverse slots in the conduits and incidentally to lock all the keepers of the column.

41. In a voting machine, a supporting frame, a plurality of counters, a plate to one side of which are attached said counters having actuating arms which project through slots in the plate into the pathway of operating means on a second plate for actuating said counter arms, said second plate, means on said second plate for actuating the counter arms by the shifting of a plate, and means for shifting a plate.

42. In a voting machine, a supporting frame, a shiftable plate to one side of which are attached counters whose arms project through slots in said plate, means on the other side of said plate adapted on the shifting of the plate for intercepting and actuating the counter arms projecting through the plate, and means for shifting the plate.

43. A voting machine, comprising a supporting and containing frame, two plates one of which is shiftable, counters on one of said plates, counter arms extending through slots in the plate, and means on the other plate for actuating the counters upon the shifting of a plate, and means for shifting a plate.

44. In a voting machine, a supporting case, a plurality of counters having actuating arms, voting disks, means for temporarily holding said disks rigidly in the pathway of the actuating arms of said counters, and mechanical means for forcing the counter arms against said disks and actuating the counters.

45. In a voting machine, a supporting frame, two plates one of which is shiftable, counters attached to one of the plates the arms of which counters project through registering slots in both plates, and means on the other plate for actuating the counter arms by the shifting of a plate.

46. In a voting machine, a supporting frame, two plates one of which is shiftable, counters attached to one of the plates the arms of which counters project through registering slots in both plates, means on the other plate for actuating the counter arms by the shifting of a plate, and means for shifting said plate.

47. In a voting machine, a containing case, a counter supporting plate, a plurality of counters, disposable stops for intercepting and actuating the counter arms, and voting disks adapted by their insertion in the machine to dispose said stops.

48. In a voting machine, a supporting case, a plurality of counters mounted on a shiftable plate, said plate, voting disks, means for temporarily holding said disks in the pathway of the counters whereby the counters are actuated upon the shifting of the plate, and means for shifting the plate.

49. In a voting machine, a supporting frame, a plate to which a plurality of counters are attached, said counters, counter arms that project through slots in said plate, means for actuating said counter arms, and means for bringing said actuating means into and out of contact with the counter arms projecting through the plate.

In testimony whereof, I affix my signature, in presence of two witnesses.

CHARLES W. BOWRON.

Witnesses:
W. H. DAGGETT,
BRUCE DODGE.